United States Patent
Kim

(10) Patent No.: US 11,814,122 B2
(45) Date of Patent: Nov. 14, 2023

(54) STEERING CONTROL SYSTEM AND METHOD FOR VEHICLE

(71) Applicant: HYUNDAI MOBIS CO., LTD., Seoul (KR)

(72) Inventor: Jeong Ku Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 130 days.

(21) Appl. No.: 17/461,291

(22) Filed: Aug. 30, 2021

(65) Prior Publication Data
US 2022/0073135 A1    Mar. 10, 2022

(30) Foreign Application Priority Data

Sep. 9, 2020    (KR) .......................... 10-2020-0115581

(51) Int. Cl.
*B62D 6/10*      (2006.01)
*B62D 15/02*     (2006.01)

(52) U.S. Cl.
CPC ........... *B62D 6/10* (2013.01); *B62D 15/0255* (2013.01)

(58) Field of Classification Search
CPC .... B62D 6/10; B62D 5/0481; B62D 15/0255; B62D 5/0463; B62D 15/025;
(Continued)

(56) References Cited

U.S. PATENT DOCUMENTS

| 5,612,877 A * | 3/1997 | Shimizu | B62D 5/0463 701/41 |
| 6,390,229 B1 * | 5/2002 | Kaji | B62D 5/0463 180/443 |

(Continued)

FOREIGN PATENT DOCUMENTS

| CA | 2312088 C * | 9/2006 | ........... B62D 5/0463 |
| CN | 104136306 A * | 11/2014 | ........... B60W 30/12 |

(Continued)

OTHER PUBLICATIONS

"ADMSV—A Differential Machine Learning based Steering Controller for Smart Vehicles;" Abegaz et al.; 2022 IEEE World AI IoT Congress (AIIoT) (pp. 629-634); Jun. 6, 2022. (Year: 2022).*

(Continued)

*Primary Examiner* — Khoi H Tran
*Assistant Examiner* — Jorge O Peche
(74) *Attorney, Agent, or Firm* — NovoTechIP International PLLC

(57) ABSTRACT

Provided is a steering control system of a vehicle, the system including a torque calculation unit calculating a required steering angle for controlling a steering device based on a driving route of the vehicle and calculating an automatic steering torque based on the calculated required steering angle; a torque correction unit calculating a correction steering torque for correcting the automatic steering torque based on the required steering angle calculated by the torque calculation unit and driving data of the vehicle; and a steering control unit controlling the steering device of the vehicle based on the automatic steering torque calculated by the torque calculation unit and the correction steering torque calculated by the torque correction unit.

9 Claims, 4 Drawing Sheets

(58) Field of Classification Search
CPC ............... B60W 10/20; B60W 30/12; B60W 30/18163; B60W 2540/18
See application file for complete search history.

(56) References Cited

U.S. PATENT DOCUMENTS

| | | | | |
|---|---|---|---|---|
| 9,132,835 B2* | 9/2015 | Yang | ................ | B60W 10/22 |
| 11,046,361 B2* | 6/2021 | Suzuki | ................ | B62D 15/025 |
| 2003/0139863 A1* | 7/2003 | Toda | ................ | B60N 2/0244 |
| | | | | 701/41 |
| 2015/0019082 A1* | 1/2015 | Inoue | ................ | B62D 15/025 |
| | | | | 701/41 |
| 2015/0336587 A1* | 11/2015 | Inoue | ................ | B60W 30/045 |
| | | | | 701/1 |
| 2017/0066475 A1* | 3/2017 | Kudo | ................ | B62D 15/025 |
| 2017/0066476 A1* | 3/2017 | Kudo | ................ | B62D 5/0463 |
| 2017/0088174 A1* | 3/2017 | Inoue | ................ | B62D 6/003 |
| 2017/0137060 A1* | 5/2017 | Wanner | ................ | B62D 1/286 |
| 2017/0203788 A1* | 7/2017 | Heo | ................ | B62D 1/286 |
| 2018/0022383 A1* | 1/2018 | Kunihiro | ................ | B62D 6/005 |
| | | | | 701/41 |
| 2018/0057009 A1* | 3/2018 | Maeda | ................ | B60W 50/087 |
| 2018/0154924 A1* | 6/2018 | Albrecht | ................ | B62D 15/025 |
| 2018/0154936 A1* | 6/2018 | Yamasaki | ................ | B62D 15/025 |
| 2018/0178834 A1* | 6/2018 | Moreillon | ................ | B62D 5/0463 |
| 2018/0181132 A1* | 6/2018 | Kunihiro | ................ | G05D 1/0088 |
| 2018/0186406 A1* | 7/2018 | Itou | ................ | B62D 5/0463 |
| 2018/0201306 A1* | 7/2018 | Tsubaki | ................ | B62D 1/286 |
| 2018/0304918 A1* | 10/2018 | Kunihiro | ................ | B62D 5/0463 |
| 2018/0304920 A1* | 10/2018 | Hirate | ................ | B62D 15/0285 |
| 2019/0009816 A1* | 1/2019 | Moreillon | ................ | B62D 6/08 |
| 2019/0016378 A1* | 1/2019 | Itou | ................ | B62D 6/002 |
| 2019/0031194 A1* | 1/2019 | Kim | ................ | G05D 1/0221 |
| 2019/0193782 A1* | 6/2019 | Tsubaki | ................ | B62D 6/007 |
| 2019/0210598 A1* | 7/2019 | Endo | ................ | G08G 1/166 |
| 2019/0263446 A1* | 8/2019 | Tsubaki | ................ | B62D 6/00 |
| 2019/0359247 A1* | 11/2019 | Tsubaki | ................ | B62D 1/286 |
| 2020/0010111 A1* | 1/2020 | Tsubaki | ................ | B62D 5/0463 |
| 2020/0039584 A1* | 2/2020 | Igarashi | ................ | G05D 1/0088 |
| 2020/0156698 A1* | 5/2020 | Tsubaki | ................ | B62D 5/0463 |
| 2020/0290668 A1* | 9/2020 | Moreillon | ................ | B62D 15/025 |
| 2021/0061344 A1* | 3/2021 | Kitazume | ................ | B62D 1/286 |
| 2021/0253161 A1* | 8/2021 | Yoshida | ................ | B62D 15/021 |
| 2021/0354748 A1* | 11/2021 | Kunihiro | ................ | B62D 5/0463 |
| 2022/0063614 A1* | 3/2022 | Kim | ................ | B60W 50/0098 |
| 2022/0073135 A1* | 3/2022 | Kim | ................ | B62D 15/025 |
| 2022/0289288 A1* | 9/2022 | Hultén | ................ | B62D 5/0484 |
| 2023/0031839 A1* | 2/2023 | Okano | ................ | B60W 30/12 |

FOREIGN PATENT DOCUMENTS

| | | | | |
|---|---|---|---|---|
| CN | 102975768 B | * | 12/2016 | ............ B62D 1/286 |
| CN | 110406589 A | * | 11/2019 | ............ B62D 1/286 |
| DE | 19635009 B4 | * | 5/2010 | ............ B62D 6/00 |
| DE | 102012215228 A1 | * | 3/2013 | ............ B62D 1/286 |
| DE | 102015203270 A1 | * | 8/2016 | ............ B60W 10/20 |
| DE | 102011081321 B4 | * | 1/2022 | ............ B60W 50/16 |
| EP | 1072498 A2 | * | 1/2001 | ............ B62D 5/0463 |
| EP | 1588922 A2 | * | 10/2005 | ............ B62D 1/286 |
| EP | 3219566 A1 | * | 9/2017 | ............ B60W 10/06 |
| EP | 3345806 A1 | * | 7/2018 | ............ B62D 1/286 |
| EP | 3345806 B1 | * | 9/2019 | ............ B62D 1/286 |
| EP | 3875349 A1 | * | 9/2021 | ............ B62D 5/04 |
| JP | H05105100 A | * | 4/1993 | |
| JP | 2003165453 A | * | 6/2003 | ............ B62D 1/163 |
| JP | 3705227 B2 | * | 10/2005 | ............ B62D 15/025 |
| JP | 2008273439 A | * | 11/2008 | |
| JP | 2017024449 A | * | 2/2017 | |
| JP | 2019513103 A | * | 5/2019 | |
| JP | 2019194059 A | * | 11/2019 | ............ B62D 1/286 |
| KR | 20170136335 A | * | 12/2017 | |
| KR | 20200071057 A | * | 6/2020 | |
| KR | 102135728 B1 | | 7/2020 | |
| WO | WO-2010073400 A1 | * | 7/2010 | ............ B62D 15/025 |
| WO | WO-2013030974 A1 | * | 3/2013 | ............ B60R 21/00 |
| WO | WO-2019225289 A1 | * | 11/2019 | ............ B62D 15/025 |
| WO | WO-2021171452 A1 | * | 9/2021 | ............ B62D 6/00 |
| WO | WO-2022126349 A1 | * | 6/2022 | ............ B60W 30/09 |

OTHER PUBLICATIONS

"Development of an Interactive Lane Keeping Control System for Vehicle;" Liu et al.; 2007 IEEE Vehicle Power and Propulsion Conference (pp. 702-706); Jul. 18, 2008. (Year: 2008).*

"Emergency Steering Evasion Assistance Control Based on Driving Behavior Analysis;" Zhao et al.; IEEE Transactions on Intelligent Transportation Systems (vol. 20, Issue: 2, pp. 457-475); Mar. 24, 2018 (Year: 2018).*

* cited by examiner

STEERING CONTROL SYSTEM AND METHOD FOR VEHICLE

CROSS-REFERENCE TO RELATED APPLICATIONS

The present application claims priority to Korean Patent Application No. 10-2020-0115581, filed Sep. 9, 2020, the entire contents of which is incorporated herein for all purposes by this reference.

BACKGROUND OF THE INVENTION

1. Field of the Invention

The present invention relates to a system and a method for steering control of a vehicle. More particularly, the present invention relates to a cooperative control between driver's steering assistance control and lane keeping assistance control through a Motor Driven Power Steering (MDPS).

2. Discussion of Related Art

The MDPS is a device that facilitates steering by employing an auxiliary power source to provide a part of steering torque that a driver needs to apply to a steering wheel when steering a vehicle, That is, the MDPS monitors the driver's steering intention through a torque sensor directly connected to the steering wheel and, upon receiving this signal, drives a motor to provide an appropriate force in consideration of the current speed of the vehicle and the like to assist a steering force.

The MDPS assists the driver by providing a large force during parking or low-speed driving and maintains the stability of the vehicle by providing a small force during high-speed driving.

Further, the lane keeping assistance system (LKAS) generating steering torque when the driving vehicle drifts out of the driving lane and returning the vehicle back to the lane is configured to demand control by measuring the speed and the steering angle of the vehicle and transmitting the steering torque required for lane keeping to the MDPS according to how much the vehicle deviates from the driving lane.

The control method of MDPS for steering control of the vehicle according to the conventional art included a method of giving a command of torque and a method of giving a command of a steering angle upon receiving the required control value.

The method of using the torque command has the advantage of natural cooperation with the driver's operation while the method of using the steering angle command has the advantage of robustness against disturbances.

However, the method of using the torque command had a problem that response characteristics to disturbances varied, while the method of using the steering angle command had a problem that transfers of control between the driver and the controller caused shocks.

The matters described above as the technical background are intended only for a better understanding of the background of the present invention and should not be taken as an acknowledgment that they pertain to the conventional art already known to those skilled in the art.

BRIEF SUMMARY OF THE INVENTION

The present invention is proposed to solve the problems described above and aims to provide a technique that allows a stable steering control as well as a smooth transfer of control between the steering control and the driver's manipulation.

In order to achieve the object described above; the steering control system of a vehicle according to the present invention includes a torque calculation unit calculating a required steering angle for controlling a steering device based on a driving route of the vehicle and calculating an automatic steering torque based on the calculated required steering angle; a torque correction unit calculating correction steering torque for correcting the automatic steering torque based on the required steering angle calculated by the torque calculation unit and the driving data of the vehicle; and a steering control unit controlling the steering device of the vehicle based on the automatic steering torque calculated by the torque calculation unit and the correction steering torque calculated by the torque correction unit.

The torque calculation unit may receive an input of the driving route of the vehicle for keeping a driving lane or changing lanes and calculate the required steering angle for controlling the steering device based on the received input of the driving route.

The torque calculation unit may calculate the automatic steering torque required for the steering device to obtain the calculated required steering angle.

The torque correction unit may calculate, as a correction steering torque, the steering torque required to obtain the required steering angle based on the driving data of the vehicle and pre-stored data according to the calculated required steering angle.

The driving data and pre-stored data of the vehicle may be angular velocity of the vehicle, and the driving data of the vehicle may be sensed through an angular velocity sensor of the vehicle.

The steering control unit may control the steering device of the vehicle to obtain the sum of an assist steering torque for assisting the input steering torque inputted from the driver, the calculated automatic steering torque, and the correction steering torque.

An assist calculation unit sensing the input steering torque through a torque sensor mounted in a column connected to a steering wheel and calculating the assist steering torque based on the sensed input steering torque may be further included.

When the input steering torque is applied, the steering control unit may apply a gradually increasing weight factor to the assist steering torque and a gradually decreasing weighting factor to the sum of the automatic steering torque and the correction steering torque.

In order to achieve the object, the steering control method according to the present invention includes: calculating the required steering angle for controlling the steering device based on the driving route of the vehicle; calculating the automatic steering torque based on the calculated required steering angle and calculating the correction steering torque for correcting the automatic steering torque based on the calculated required steering angle and the driving data of the vehicle; and controlling the steering device of the vehicle based on the calculated automatic steering torque and the correction steering torque.

Prior to the calculating of the required steering angle, receiving an input of the driving route of the vehicle for keeping the driving lane or changing lanes may be further included, and in the calculating of the required steering angle, the required steering angle for controlling the steering device may be calculated.

In the calculating of the automatic steering torque and the correction steering torque, the automatic steering torque required for the steering device to obtain the calculated required steering angle may be calculated.

In the calculating of the automatic steering torque and the correction steering torque, the steering torque required to obtain the required steering angle may be calculated as the correction steering torque based on the driving data of the vehicle and the pre-stored data according to the calculated required steering angle.

In the controlling of the steering device of the vehicle, the steering device of the vehicle may be controlled to obtain the sum of the assist steering torque for assisting the input steering torque inputted from the driver, the calculated automatic steering torque, and the correction steering torque.

Prior to the controlling of the steering device of the vehicle, sensing the input steering torque through the torque sensor mounted in a column connected to a steering wheel and calculating the assist steering torque based on the sensed input steering torque may be further included.

In the controlling of the steering device of the vehicle, when the input steering torque is applied, a gradually increasing weighting factor may be applied to the assist steering torque and a gradually decreasing weighting factor may be applied to the sum of the automatic steering torque and the correction steering torque.

According to the steering control system and method of the vehicle of the present invention, the correction steering torque for correcting the automatic steering torque based on the required steering angle and the driving data of the vehicle is reflected in the torque control to have an effect of neutralizing a disturbance.

Further, even when the input steering torque inputted from the driver is generated, there is an effect of allowing a smooth transfer of control.

DETAILED DESCRIPTION OF THE INVENTION

Figure 1:
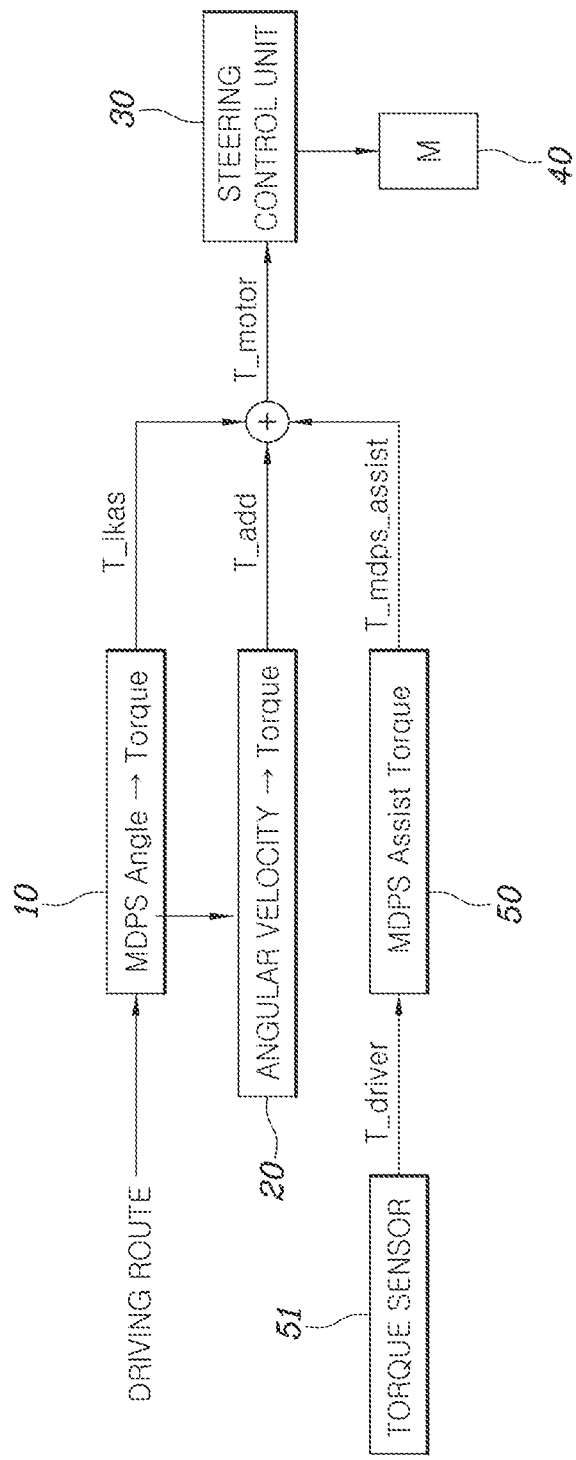
FIG. 1 is a block diagram of a steering control system of a vehicle according to an embodiment of the present invention.

Specific structural or functional descriptions of the embodiments of the present invention disclosed in the present specification or application are presented by way of examples only for the purpose of describing the embodiments according to the present invention, and the embodiments according to the present invention may be implemented in various forms and should not be construed as being limited to the embodiments described in the present specification or application.

Since the embodiment of the present invention may be modified in various ways and have various forms, specific embodiments will be illustrated in the drawings and described in the present specification or application. However, this is not intended to limit the embodiments according to the concept of the present invention to the specific forms and should be construed as including all modifications, equivalents, and substitutes included in the spirit and technical scope of the present invention.

Terms such as first and/or second may be used to describe various components, but the components should not be limited by the terms. The terms only serve the purpose of distinguishing one component from other components. For example, the first component may be referred to as the second component, and similarly, the second component may also be referred to as the first component without deviating from the scope of the right according to the concept of the present invention.

When a component is referred to as being "connected" or "coupled" to another component, it may be directly connected or coupled to another component, but it should be understood that other components may exist in between. On the other hand, when a component is referred to as being "directly connected" or "directly coupled" to another component, it should be understood that there are no intervening components present. Other expressions describing the relationship between components such as "between" and "just between", or "adjacent to" and "directly adjacent to" should be interpreted in the same manner.

The terms used herein are used for the purpose of describing particular embodiments only and are not intended to limit the invention. Singular expressions include plural expressions unless the context explicitly indicates otherwise. In the present specification, terms such as "comprise" or "have" are intended to designate the presence of implemented features, numbers, steps, operations, components, parts, or combinations thereof and should not be understood to preclude the presence or additional possibilities of one or more of other features, numbers, steps, operations, components, parts or combinations thereof in advance.

Unless otherwise defined, all terms used herein, including technical or scientific terms, have the same meanings as are generally understood by those with common knowledge in the art to which the present invention pertains. It will be further understood that terms, such as those defined in commonly used dictionaries, should be interpreted as having a meaning that is consistent with their meaning in the context of the present specification, and will not be interpreted in an idealized or overly formal sense unless expressly so defined herein.

In the following, the present invention will be described in detail by describing preferred embodiments of the present invention with reference to the accompanying drawings.

Figure 2:
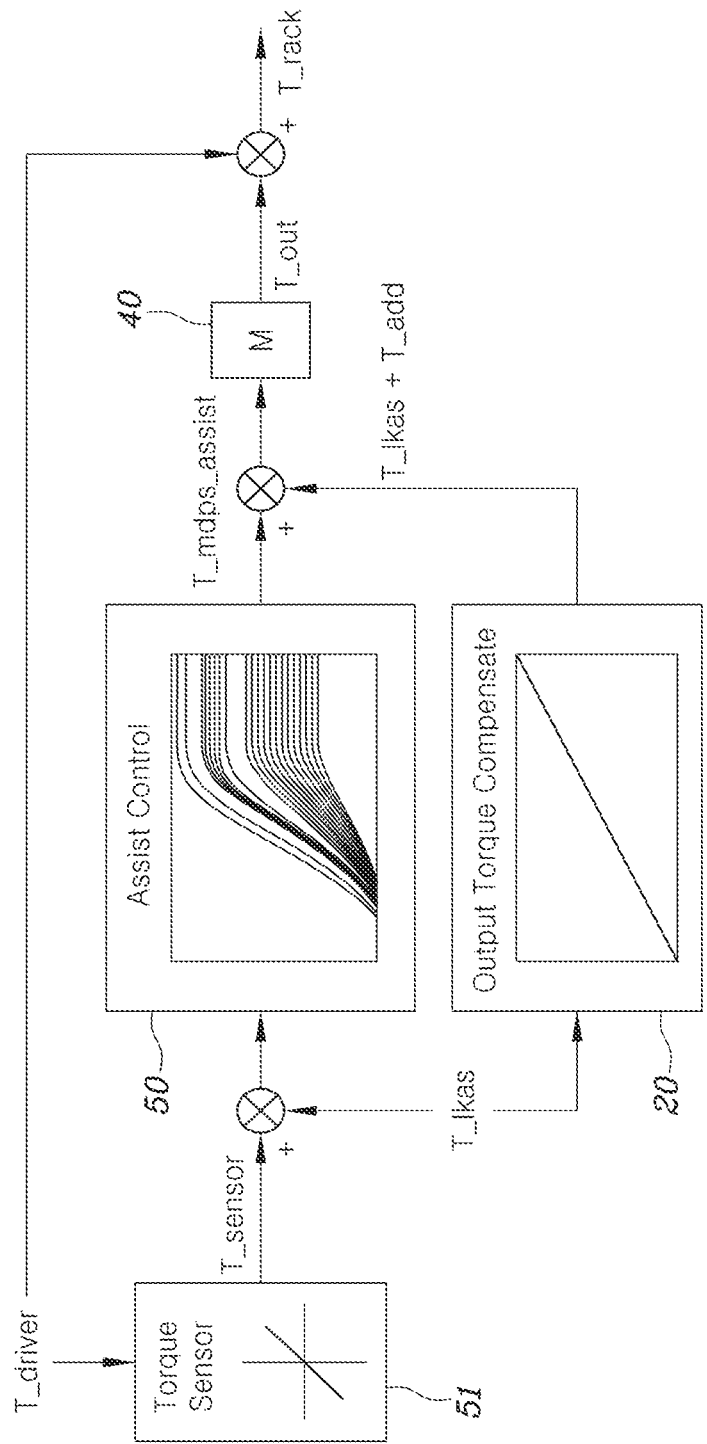
FIG. 2 is a control diagram of a steering control system of a vehicle according to an embodiment of the present invention.

FIG. 1 is a block diagram of a steering control system of a vehicle according to an embodiment of the present invention, and FIG. 2 is a control diagram of a steering control system of a vehicle according to an embodiment of the present invention.

FIG. 1 shows that a steering control system of a vehicle according to an embodiment of the present invention includes a torque calculation unit 10 calculating a required steering angle for controlling a steering device 40 based on a driving route of the vehicle and calculating an automatic steering torque T_lkas based on the calculated required steering angle; a torque correction unit 20 calculating correction steering torque T_add for correcting the automatic steering torque T_lkas based on the required steering angle calculated by the torque calculation unit 10 and the driving data of the vehicle; and a steering control unit 30 controlling the steering device 40 of the vehicle based on the automatic steering torque T_lkas calculated by the torque calculation unit 10 and the correction steering torque T_add calculated by the torque correction unit 20.

The torque calculation unit 10, the torque correction unit 20, and the steering control unit 30 according to an exemplary embodiment of the present invention may be implemented through a processor (not shown) configured to perform operations to be described below using an algorithm configured to control the operations of various components of a vehicle or a nonvolatile memory (not shown) configured to store data relating to software commands for reproducing the algorithm and the data stored in the memory. Here, the memory and the processor may be implemented as individual chips. Alternatively, the memory and the processor may be implemented as an integrated single chip. The processor may take the form of one or more processors.

Specifically, the steering control system of the vehicle according to an embodiment of the present invention is a system controlling the steering of the vehicle through an autonomous driving system, advanced driver assistance system (ADAS), or the like of the vehicle and, in particular, may include a vehicle motion control (VMC) control system controlling the behavior of the vehicle.

In particular, the steering control system of the vehicle may perform an automatic steering mode by a lane keeping assistance system (LKAS) that keeps a lane by generating a steering torque in the motor driven power steering (MDPS). Techniques such as lane keeping assist (LKA), lane following assist (LFA), highway driving assist (HDA), smart parking assist (SPA), remote smart parking assist (RSPA), highway driving pilot (HDP), and the like may be applied to the LKAS.

The torque calculation unit 10 may calculate the required steering angle based on the route the vehicle will travel and calculate the automatic steering torque T_lkas based on the calculated required steering angle. The automatic steering torque T_lkas may be calculated from a map pre-mapped according to the required steering angle.

Here, the steering device 40 may be a driving motor of MDPS that varies the steering angle of the vehicle.

According to the related art, the steering control unit 30 performed the steering control of the vehicle by controlling the steering device 40 of the vehicle based on the calculated automatic steering torque (T_lkas).

In particular, such a torque control method was used in the LKA, LFA, and HDA but had a problem of a poor response characteristic caused by the susceptibility to disturbances such as friction between a tire and a road surface, tugging force inside the vehicle, or the like. Accordingly, the vehicle pulled to one side unable to follow the driving curvature to be pushed, thereby making it difficult to use the method in the sharp steering area where the steering angle is relatively large.

In contrast to the torque control method, the steering angle control method of calculating the steering angular velocity according to the required steering angle and controlling the steering torque to obtain the calculated steering angular velocity was used in SPA, RSPA, HDP, and the like. The steering angle control method was good at maintaining the steering angle by controlling to obtain the steering angular velocity even when a disturbance is inputted.

However, the steering angle control method had a problem that a switching shock occurred at the time of transfer of control when the input steering torque T_driver was inputted from a driver. In addition, since there was no transition step between a manual steering mode in which the driver controls the steering in person and the automatic steering mode, a sense of dissimilarity arose and the operation state needed checking at the same time such that the control modes could not be switched swiftly.

The torque correction unit 20 of the present invention calculates the correction steering torque T_add to be reflected in the automatic steering torque T_lkas based on the required steering angle and driving data of the vehicle, and the steering control unit 30 may control the steering device 40 of the vehicle by applying the correction steering torque T_add to the automatic steering torque T_lkas.

Accordingly, applying to the torque control the correction steering torque T_add for correcting the automatic steering torque T_lkas based on the required steering angle and driving data of the vehicle has an effect of neutralizing the disturbance and concurrently allowing a smooth transfer of control even when the input steering torque T_driver inputted from the driver is generated.

The torque calculation unit 10 may receive an input of the driving route of the vehicle for keeping the driving lane or changing lanes and calculate the required steering angle for controlling the steering device 40 based on the inputted driving route.

In particular, the torque calculation unit 10 may calculate the required steering angle for controlling the steering device 40 in the automatic steering mode in which the input steering torque T_driver inputted from the driver and the assist steering torque T_mdps_assist for assisting the input steering torque T_driver approach zero.

The torque calculation unit 10 may calculate the required steering angle along the driving route for keeping the lane in which the vehicle is currently driving by recognizing the lane with a sensor or calculate the required steering angle of the vehicle along the driving route for changing lanes by navigation and the like. In particular, the torque calculation unit 10 may calculate the curvature that the vehicle should follow along the driving route and calculate the required steering angle according to the calculated curvature.

The torque calculation unit 10 may calculate the required steering angle along the driving route for entering or existing during a parking control of the vehicle.

Specifically, the torque calculation unit 10 may calculate the automatic steering torque T_lkas required for the steering device 40 to obtain the calculated required steering angle.

In particular, the torque calculation unit 10 may calculate the automatic steering torque T_lkas for following the required steering angle calculated based on the automatic steering torque T_lkas pre-mapped according to the required steering angle. The steering control unit 30 controls the steering device 40 by the calculated automatic steering torque T_lkas so that the steering angle of the vehicle may obtain the required steering angle.

In addition, the torque correction unit 20 may calculate, as the correction steering torque T_add, the steering torque required to obtain the required steering angle based on the driving data of the vehicle and the pre-stored data according to the calculated required steering angle.

In particular, the driving data and pre-stored data of the vehicle may be the angular velocity of the vehicle, and the driving data of the vehicle may be sensed through an angular velocity sensor (not shown) of the vehicle.

The angular velocity sensor (not shown) may sense the lateral angular velocity of the vehicle in real time, and the torque correction unit 20 may calculate, as the correction steering torque T_add, the steering torque for correcting the difference between the angular velocity of the vehicle sensed by the angular velocity sensor (not shown) and the angular velocity pre-stored according to the required steering angle.

Accordingly, there is an effect of improving the following performance by which the angular velocity of the vehicle shaken by the disturbance follows the pre-stored angular velocity.

The steering control unit 30 may control the steering device 40 to obtain the sum of the assist steering torque T_mdps_assist for assisting the input steering torque T_driver inputted from the driver, the calculated automatic steering torque T_lkas, and the correction steering torque T_add.

When the input steering torque T_driver inputted from the driver is zero, the assist steering torque T_mdps_assist also converges to zero, and the steering control unit 30 may control in the automatic steering mode in which the steering device 40 of the vehicle is controlled to obtain the sum of the automatic steering torque T_lkas and the correction steering torque T_add.

On the other hand, when the input steering torque T_driver inputted from the driver is generated, the steering control unit 30 may control in the manual steering mode in which the steering device 40 of the vehicle is controlled by the assist steering torque T_mdps_assist for assisting the input steering torque T_driver.

The steering control unit 30 may control the steering device 40 of the vehicle to obtain the sum T_motor of the assist steering torque T_mdps_assist, the calculated automatic steering torque T_lkas, and the correction steering torque T_add in the transition section.

Accordingly, there is an effect of smoothly and naturally controlling the transfer of control in the transition section in which the automatic steering mode and the manual steering mode overlap each other.

For example, an assist calculation unit 50 sensing the input steering torque T_driver through a torque sensor 51 mounted in a column connected to a steering wheel and calculating the assist steering torque T_mdps_assist based on the sensed input steering torque T_driver may be further included.

When the input steering torque T_driver inputted from the driver is generated, the assist calculation unit 50 may calculate the assist steering torque T_mdps_assist for assisting the input steering torque T_driver. In particular, the assist calculation unit 50 may sense the input steering torque T_driver through the torque sensor 51 and calculate the input steering torque T_mdps_assist according to the sensed input steering torque T_driver.

The steering device 40 of the vehicle may be controlled by the steering control unit 30 to obtain the sum T_motor of the assist steering torque T_mdps_assist, the calculated automatic steering torque T_lkas, and the correction steering torque T_add.

In addition, in the rack of the MDPS rotating the steering wheel accordingly, the torque of T_rack obtained by adding the input steering torque T_driver to the sum of the assist steering torque T_mdps_assist, the calculated automatic steering torque T_lkas, and the correction steering torque T_add.

Figure 3:
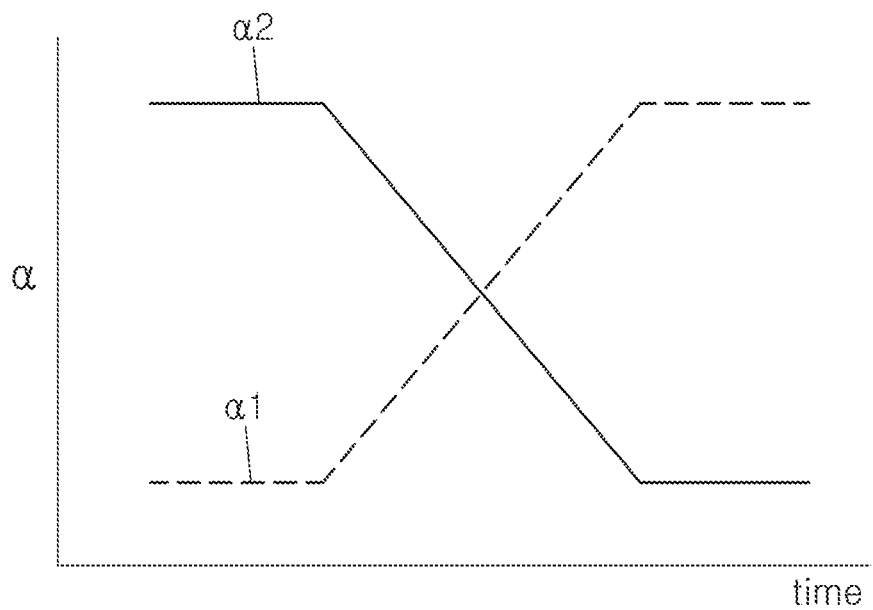
FIG. 3 is a graph showing weighting factors applied to the sum of automatic steering torque and correction steering torque and an assist steering torque according to an embodiment of the present invention.

FIG. 3 is a graph showing weighting factors α applied to the sum of the automatic steering torque T_lkas and the correction steering torque T_add and the assist steering torque T_mdps_assist according to an embodiment of the present invention.

FIG. 3 further shows that, when the input steering torque T_driver is applied, the steering control unit 30 may apply a gradually increasing weighting factor $\alpha 1$ to the assist steering torque T_mdps_assist and a gradually decreasing weighting factor $\alpha 2$ to the sum of the automatic steering torque T_lkas and the correction steering torque T_add.

The steering control unit 30 may transition from the automatic steering mode to the manual steering mode when the input steering torque T_driver is generated. The control unit 30 may apply the weighting factors $\alpha 1$, $\alpha 2$ to the assist steering torque T_mdps_assist and the sum of the automatic steering torque T_lkas and the correction steering torque T_add, respectively.

When a transition is made to the manual steering mode, the weighting factor $\alpha 1$ of the assist steering torque T_mdps_assist for assisting the input steering torque T_driver may be gradually increased, and conversely, the weighting factor $\alpha 2$ of the sum of the automatic steering torque T_lkas and the correction steering torque T_add may be decreased.

For example, the sum of the weighting factor of the assist steering torque T_mdps_assist and the weighting factor of the sum of the automatic steering torque T_lkas and the correction steering torque T_add may be constant, the weighting factor of the assist steering torque T_mdps_assist may be the greatest in the manual steering mode, and the weighting factor of the sum of the automatic steering torque T_lkas and the correction steering torque T_add may be the greatest in the automatic steering mode.

Conversely, when the input steering torque T_driver is not inputted, the steering control unit 30 may transition from the manual steering mode to the automatic steering mode. In this case, the weighting factor of the assist steering torque T_mdps_assist for assisting the input steering torque T_driver may be gradually decreased, and conversely, the weighting factor of the sum of the automatic steering torque T_lkas and the correction steering torque T_add may be gradually increased.

Accordingly, there is an effect of allowing a smooth transfer of control and a subsequent transition of the steering control modes.

Figure 4:
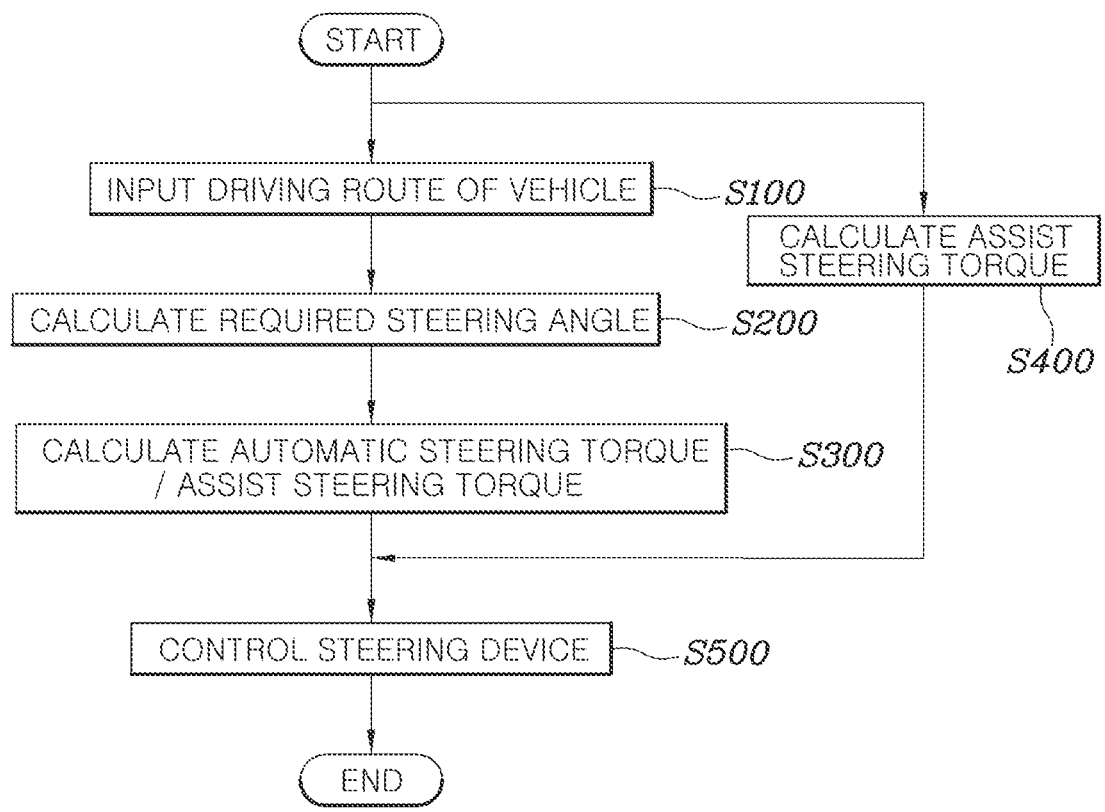
FIG. 4 is a flowchart showing a steering control method of a vehicle according to an embodiment of the present invention.

FIG. 4 is a flowchart showing a steering control method of a vehicle according to an embodiment of the present invention.

FIG. 4 further shows that the steering control method of a vehicle according to an embodiment of the present invention includes a step S200 of calculating the required steering angle for controlling the steering device 40 based on the driving route of the vehicle; a step S300 of calculating the automatic steering torque T_lkas based on the calculated required steering angle and calculating the correction steering torque T_add for correcting the automatic steering torque T_lkas based on the calculated required steering angle and the driving data of the vehicle; and a step S500 of controlling the steering device 40 of the vehicle based on the calculated automatic steering torque T_lkas and the correction steering torque T_add.

Prior to the step S200 of calculating the required steering angle, a step S100 of receiving an input of the driving route of the vehicle for keeping the driving lane or changing lanes may be further included, and, in the step S200 of calculating the required steering angle, the required steering angle for controlling the steering device 40 may be calculated.

In the step S300 of calculating the automatic steering torque T_lkas and the correction steering torque T_add, the automatic steering torque T_lkas required for the steering device 40 to obtain the calculated required steering angle may be calculated.

In the step S300 of calculating the automatic steering torque T_lkas and the correction steering torque T_add, the steering torque required to obtain the required steering angle may be calculated as the correction steering torque T_add based on the driving data of the vehicle and the pre-stored data according to the calculated required steering angle.

In the step S500 of controlling the steering device 40 of the vehicle, the steering device 40 may be controlled to obtain the sum of the assist steering torque T_mdps_assist for assisting the input steering torque T_driver inputted from the driver, the calculated automatic steering torque T_lkas, and the correction steering torque T_add.

Prior to the step S500 of controlling the steering device 40 of the vehicle, a step S400 of sensing the input steering torque T_driver through the torque sensor 51 mounted in the column connected to the steering wheel and calculating the assist steering torque T_mdps_assist based on the sensed input steering torque T_driver may be further included.

In the step S500 of controlling the steering device 40 of the vehicle, when the input steering torque T_driver is applied, a gradually increasing weighting factor may be applied to the assist steering torque T_mdps_assist and a gradually decreasing weighting factor may be applied to the sum of the automatic steering torque T_lkas and the correction steering torque T_add.

Specific embodiments of the present invention are illustrated and described, but it will be self-evident to those skilled in the art that the present invention may be improved upon and modified in various ways within the scope not departing from the technical spirit of the present invention provided by the patent claims below.

What is claimed is:

1. A steering control system for a vehicle, comprising:
a processor; and
a non-transitory computer-readable medium in communication with the processor and storing instructions that, when executed by the processor, cause the processor to control the steering control system to perform:
calculating, based on a driving route of the vehicle, a required steering angle for controlling a steering device of the vehicle;
calculating, based on the calculated required steering angle, an automatic steering torque;
calculating, based on the required steering angle and driving data of the vehicle, a correction steering torque for correcting the calculated automatic steering torque;
controlling, based on the calculated automatic steering torque and the calculated correction steering torque, the steering device;
controlling the steering device to obtain a sum of an assist steering torque for assisting an input steering torque received from a driver of the vehicle, the calculated automatic steering torque and the calculated correction steering torque; and
in response to the driver applying the input steering torque, performing:
applying a first weight factor to the assist steering torque, the first weight factor increasing gradually; and
applying a second weight factor to a sum of the calculated automatic steering torque and the calculated correction steering torque, the second weight factor decreasing gradually.

2. The steering control system of claim 1, wherein, for calculating the required steering angle, the instructions, when executed by the processor, further cause the processor to control the steering control system to perform:
receiving a driving route of the vehicle; and
calculating, based on the received driving route, the required steering angle.

3. The steering control system of claim 1, wherein, for calculating the correction steering torque, the instructions, when executed by the processor, further cause the processor to control the steering control system to perform calculating a steering torque required for obtaining the required steering angle based on the driving data of the vehicle and pre-stored data according to the calculated required steering angle.

4. The steering control system of claim 3, wherein:
the driving data of the vehicle or the pre-stored data comprise an angular velocity of the vehicle, and
the vehicle comprises an angular velocity sensor configured to sense the driving data of the vehicle.

5. The steering control system of claim 1, the instructions, when executed by the processor, further cause the processor to control the steering control system to perform:
sensing, the input steering torque; and
calculating the assist steering torque based on the sensed input steering torque.

6. A steering control method of a vehicle, comprising:
calculating, based on a driving route of the vehicle, a required steering angle for controlling a steering device of the vehicle;
calculating, based on the calculated required steering angle, an automatic steering torque;
calculating, based on the calculated required steering angle and driving data of the vehicle, a correction steering torque for correcting the calculated automatic steering torque; and
controlling, based on the calculated automatic steering torque and the calculated correction steering torque, the steering device;
controlling the steering device to obtain a sum of an assist steering torque for assisting an input steering torque received from a driver of the vehicle, the calculated automatic steering torque and the calculated correction steering torque; and
in response to the driver applying the input steering torque, performing:
applying a first weight factor to the assist steering torque, the first weight factor increasing gradually; and
applying a second weight factor to a sum of the calculated automatic steering torque and the calculated correction steering torque, the second weight factor decreasing gradually.

7. The steering control method of claim 6, wherein calculating the required steering angle comprises:
receiving a driving route of the vehicle; and
calculating, based on the received driving route, the required steering angle.

8. The steering control method of claim 6, wherein calculating the correction steering torque comprises calculating a steering torque required for obtaining the required steering angle based on the driving data of the vehicle and pre-stored data according to the calculated required steering angle.

9. The steering control method of claim 6, further comprising:
sensing the input steering torque; and
calculating the assist steering torque based on the sensed input steering torque.

* * * * *